United States Patent [19]
Gowan
[11] 3,715,574
[45] Feb. 6, 1973

[54] INTERFACE CONVERTER FOR FEEDING HIGH FREQUENCY SIGNALS INTO LOW FREQUENCY CIRCUITS

[75] Inventor: Richard L. Gowan, Bonita, Calif.
[73] Assignee: The United States of America as represented by the Secretary of the Navy

[22] Filed: July 21, 1971
[21] Appl. No.: 164,564

[52] U.S. Cl. ..........235/154, 235/92 CA, 235/92 CC, 235/92 FQ, 307/234, 328/112, 328/119, 340/347 DD
[51] Int. Cl. ............G06f 5/02, G06f 5/06, H041 3/00
[58] Field of Search ....235/155, 154, 92 DM, 92 CA, 235/92 EA, 92 FQ, 92 CC, 177; 340/347 DD, 174 SR, 172.5; 307/234; 328/112, 119

[56] References Cited

UNITED STATES PATENTS

| | | | |
|---|---|---|---|
| 2,931,014 | 3/1960 | Bucholz et al. | 340/174 SR |
| 3,566,090 | 2/1971 | Johnson | 235/92 DM |
| 3,064,889 | 11/1962 | Hupp | 235/92 EA |
| 3,435,196 | 3/1969 | Schmid | 235/92 CC |
| 3,264,457 | 8/1966 | Seegmiller et al. | 340/347 DA |

*Primary Examiner*—Maynard R. Wilbur
*Assistant Examiner*—Thomas J. Sloyan
*Attorney*—R. S. Sciascia et al.

[57] ABSTRACT

Apparatus for conversion of high speed binary to binary coded decimal with low speed circuitry. An information incoming pulse is digitized at the high frequency rate and this digital equivalent is stored in a first bit register. A low frequency digitizing oscillator is coupled through a gate circuit to a bit register identical to the first bit register and into a binary-to-digital converter. A bit by bit comparator compares the high frequency pulse count with the low frequency pulse count and produces a stop signal to the gate circuit when the low frequency count equals the stored high frequency count.

1 Claim, 1 Drawing Figure

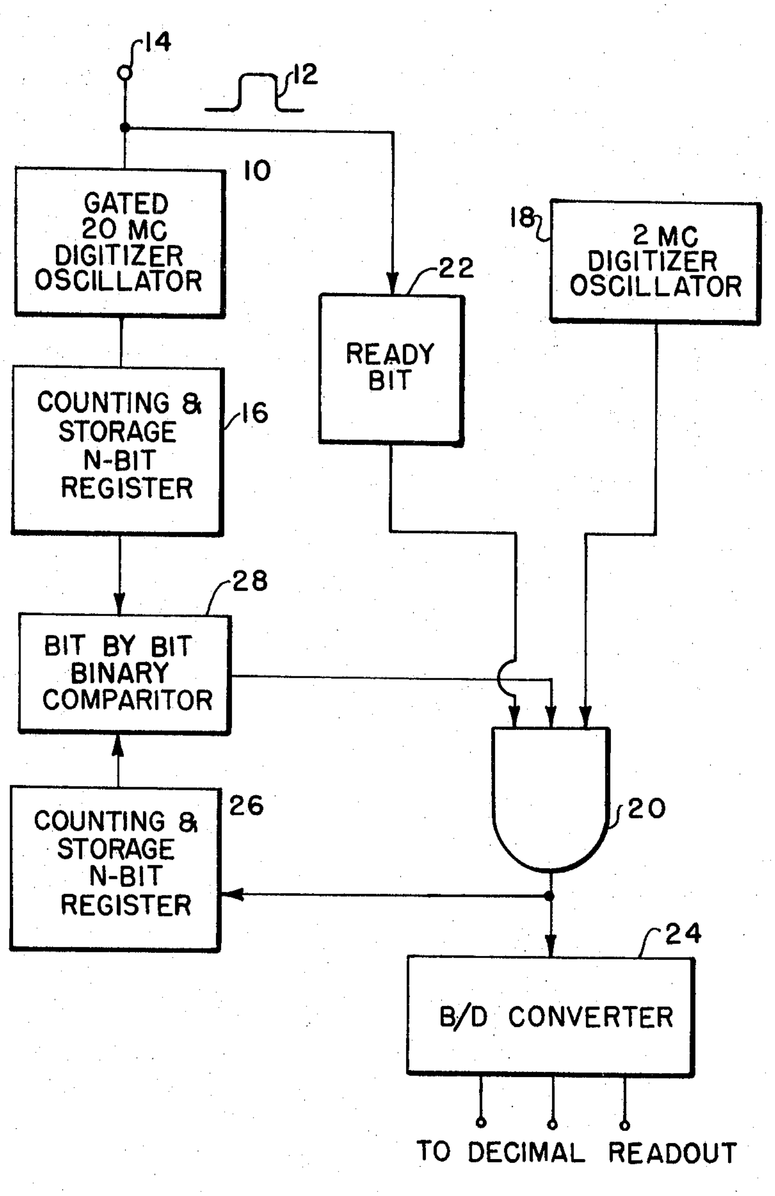
INVENTOR.
BY RICHARD L. GOWAN
T. M. Phillips
George J. Rubens

INTERFACE CONVERTER FOR FEEDING HIGH FREQUENCY SIGNALS INTO LOW FREQUENCY CIRCUITS

BACKGROUND OF THE INVENTION

The present invention relates to interface converters and more particularly to interface converters used as interface equipment for feeding high frequency signals into low frequency circuits. In pulse isolation and measuring systems such as described in U. S. Pat. No. 2,502,975, it may be desirable to use an "off-line" counter which can be used in the complete absence of computer control. The "off-line" computer performs the function of digitizing the pulse width analogues of monitored signals and displays them on a decimal readout. Where the digitizing frequency (20 MHz) is beyond the range of the integrated binary to digital (B/D) circuitry which will not accept data at a rate greater than its upper operating limit (2 MHz).

SUMMARY OF THE INVENTION

The present invention provides an interface between a high speed binary system and a low speed binary system. High frequency pulses from the high speed system representing an isolated quantity to be measured are counted and stored in a bit register. Low frequency pulses are gated to the low speed system and to a bit register. The output of the bit register is compared in a bit by bit comparator with the stored high speed pulses. When sufficient low frequency pulses have been received in the comparator to equal the number of high frequency pulses, the gate is turned off and the low speed circuit will have received at a lower frequency of the binary coded equivalent of the high speed binary quantity.

STATEMENT OF THE OBJECTS OF THE INVENTION

Accordingly, an object of the invention is the provision of an interface conversion between a high speed binary system and a low speed binary system.

Another object of the invention is the provision of a circuit which will connect a sampled quantity digitized at a high frequency to a sampled quantity digitized at a low frequency.

Other objects and many of the attendant advantages of this invention will be readily appreciated as the same becomes better understood by reference to the following detailed description when considered in connection with the accompanying drawing in which there is shown in the single FIGURE a block diagram of the preferred embodiment.

DESCRIPTION OF THE PREFERRED EMBODIMENT

Referring now to the single FIGURE there is shown a high frequency digitizing oscillator 10 which is triggered on for the duration of a pulse 12 applied to the input terminal 14. The output pulses from oscillator 10 are fed to a bit register 16 where the pulses are counted and stored. A low frequency digitizing oscillator 18 is fed to gate 20 which is gated on by a gate signal from ready bit circuit 22. The output pulses from oscillator 18 are then fed to binary-to-decimal converter 24 and to N-bit register 26. The pulses received by register 26 are compared in bit-by-bit binary comparator 28 with the stored pulses received by register 16. The output of comparator 28 is connected as an input to gate 20.

In operation, the 20 MHz digitizing oscillator 10 is turned on by the incoming pulse 12. For each cycle of oscillator 10 a count is stored in register 16. The total number of counts stored in register 16 is proportional to the width of the incoming pulse 12. When the incoming pulse 12 has had its width digitized and stored at the 20 MHz rate in register 16, ready bit circuit 22 is set true by the trailing edge of pulse 12. With the ready bit true, gate 20 is enabled and a 2 MHz digitizing signal is fed to storage register 26 which is identical to register 16. At the same time register 26 is receiving pulses from oscillator 18, binary-to-decimal converter 24 is also receiving the same pulses. While register 26 and converter 24 are receiving input pulses from oscillator 18, a bit by bit binary comparison is being performed by comparator 28. When the comparison has been detected, gate 20 is turned off inhibiting the further entry of 2 MHz pulses into converter 24 and register 26. Since the bit arrangement in register 26 is the same as the bit arrangement of register 16 as detected by comparator 28, the same number of input pulses were applied to converter 24 and register 26, the binary to binary coded decimal equivalent of this number of pulses is stored in the outputs of converter 24. This binary coded number is then available for driving decimal readout devices (not shown). When the conversion process time has been completed, the device is reset and a subsequent pulse may be processed.

Obviously many modifications and variations of the present invention are possible in the light of the above teachings. It is therefore to be understood that within the scope of the appended claims the invention may be practiced otherwise than as specifically described.

What is claimed is:

1. In an interface converting means for generating a low speed digitized signal that is the equivalent to the same information digitized at a high speed, the combination comprising:

a. an input terminal for receiving a gate pulse to be digitized;

b. a gated high frequency oscillator coupled to said input terminal and being gated on for the duration of said gate pulse to be digitized, c. a low frequency oscillator, d. a first counting and storage bit register coupled to said gated high frequency oscillator for counting and storing the number of pulses received during said gate pulse duration, e. a gate circuit having a first input coupled to said low frequency oscillator, a second input, a third input and an output, f. a ready bit circuit connected in circuit with the second input of said gate circuit and said input terminal and being responsive to the termination of said gate pulse duration to turn on said gate circuit allowing low frequency pulses to flow through, g. a second counting and storage bit register coupled to the output of said gate circuit for counting and storing low frequency pulses flowing through said gate circuit, h. comparator circuit means coupled to said first and second counting and storage bit register and having an output coupled to the third input of said gate circuit for gating off said gate circuit when the number of low frequency pulses received in said second counting and storage bit register equal the number of high frequency pulses stored in said first counting and storage bit register.

* * * * *